United States Patent
Ou et al.

(10) Patent No.: US 10,356,841 B2
(45) Date of Patent: Jul. 16, 2019

(54) METHOD, APPARATUS, AND SYSTEM FOR ENHANCING CONCURRENT PROCESSING CAPABILITY OF WIRELESS LOCAL AREA NETWORK

(71) Applicant: Huawei Technologies Co., Ltd., Shenzhen (CN)

(72) Inventors: Liyun Ou, Nanjing (CN); Wei Liu, Nanjing (CN); Lin Zhang, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/827,309

(22) Filed: Nov. 30, 2017

(65) Prior Publication Data
US 2018/0084604 A1    Mar. 22, 2018

Related U.S. Application Data

(63) Continuation of application No. PCT/CN2016/083470, filed on May 26, 2016.

(30) Foreign Application Priority Data
Jun. 1, 2015 (CN) .......................... 2015 1 0293514

(51) Int. Cl.
*H04W 76/36* (2018.01)
*H04W 28/16* (2009.01)
(Continued)

(52) U.S. Cl.
CPC .......... *H04W 76/36* (2018.02); *H04W 28/16* (2013.01); *H04W 84/12* (2013.01); *H04W 92/12* (2013.01)

(58) Field of Classification Search
CPC ..... H04W 76/36; H04W 28/16; H04W 84/12; H04W 92/12
See application file for complete search history.

(56) References Cited

U.S. PATENT DOCUMENTS

| 2004/0078598 A1 | 4/2004 | Barber et al. |
| 2007/0297362 A1 | 12/2007 | Kimura et al. |
| (Continued) | | |

FOREIGN PATENT DOCUMENTS

| CN | 103313306 A | 9/2013 |
| CN | 103401909 A | 11/2013 |
| (Continued) | | |

OTHER PUBLICATIONS

Machine Translation and Abstract of Chinese Publication No. CN103313306, Sep. 18, 2013, 30 pages.
(Continued)

*Primary Examiner* — Ronald B Abelson
(74) *Attorney, Agent, or Firm* — Conley Rose, P.C.

(57) ABSTRACT

A method, an apparatus, and a system for enhancing a concurrent processing capability of a wireless local area network (WLAN) are disclosed. The method includes receiving a first association request including an identifier of a first station (STA) that is from the first STA; performing association with the first STA; sending a first association query request including the identifier of the first STA to a WLAN controller; after the first STA is associated, receiving an association query response from the WLAN controller; and performing disassociation from the first STA when the association query response is used to instruct an access point (AP) not to associate with the first STA. When a large quantity of association events need to be concurrently processed, a STA is associated with at first, improving user experience.

10 Claims, 5 Drawing Sheets

(51) Int. Cl.
*H04W 84/12* (2009.01)
*H04W 92/12* (2009.01)

(56) References Cited

U.S. PATENT DOCUMENTS

| | | |
|---|---|---|
| 2008/0031212 A1 | 2/2008 | Ogura |
| 2009/0215482 A1 | 8/2009 | Blange et al. |
| 2013/0247150 A1 | 9/2013 | Cherian et al. |
| 2014/0105196 A1 | 4/2014 | Seok et al. |
| 2015/0040195 A1 | 2/2015 | Park et al. |
| 2015/0063319 A1 | 3/2015 | Cherian et al. |

FOREIGN PATENT DOCUMENTS

| | | |
|---|---|---|
| CN | 104182490 A | 12/2014 |
| CN | 104503710 A | 4/2015 |
| JP | 2005167580 A | 6/2005 |
| JP | 2006081164 A | 3/2006 |
| JP | 2007274520 A | 10/2007 |
| JP | 2008042451 A | 2/2008 |
| JP | 2009522844 A | 6/2009 |
| JP | 2014526841 A | 10/2014 |
| WO | 2005004406 A1 | 1/2005 |

OTHER PUBLICATIONS

Machine Translation and Abstract of Chinese Publication No. CN103401909, Nov. 20, 2013, 26 pages.
Machine Translation and Abstract of Chinese Publication No. CN104182490, Dec. 3, 2014, 14 pages.
Machine Translation and Abstract of Chinese Publication No. CN104503710, Apr. 8, 2015, 17 pages.
Calhoun, P., et al., "Control and Provisioning of Wireless Access Points (CAPWAP) Protocol Specification," RFC 5415, Mar. 2009, 155 pages.
Foreign Communication From a Counterpart Application, PCT Application No. PCT/CN2016/083470, English Translation of International Search Report dated Aug. 10, 2016, 2 pages.
Foreign Communication From a Counterpart Application, PCT Application No. PCT/CN2016/083470, English Translation of Written Opinion dated Aug. 10, 2016, 7 pages.
Machine Translation and Abstract of Japanese Publication No. JP2005167580, Jun. 23, 2005, 15 pages.
Machine Translation and Abstract of Japanese Publication No. JP2006081164, Mar. 23, 2006, 76 pages.
Foreign Communication From a Counterpart Application, Japanese Application No. 2017-562007, Japanese Decision for Grant dated Dec. 18, 2018, 1 page.
Foreign Communication From a Counterpart Application, European Application No. 15802495.8, Extended European Search Report dated Apr. 11, 2018, 9 pages.

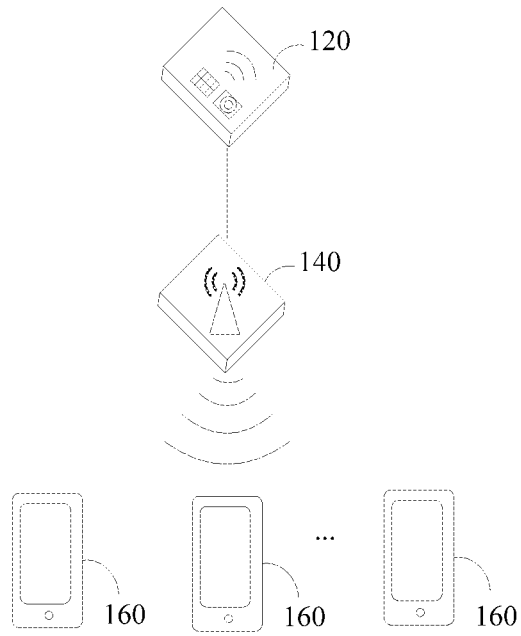

FIG. 1

An AP receives a first association request sent by a first STA, where the first association request includes an identifier of the first STA, and the first association request is used to indicate that the first STA requests association with the AP — 201

The AP performs association with the first STA — 202

The AP sends a first association query request to a WLAN controller, where the first association query request includes the identifier of the first STA, and the first association query request is used to query whether the WLAN controller allows the first STA to be associated with the AP — 203

After associating with the first STA, the AP receives an association query response returned by the WLAN controller, where the association query response is a response message for the first association query request — 204

The AP performs disassociation from the first STA when the association query response is used to instruct the AP not to perform association with the first STA — 205

FIG. 2A

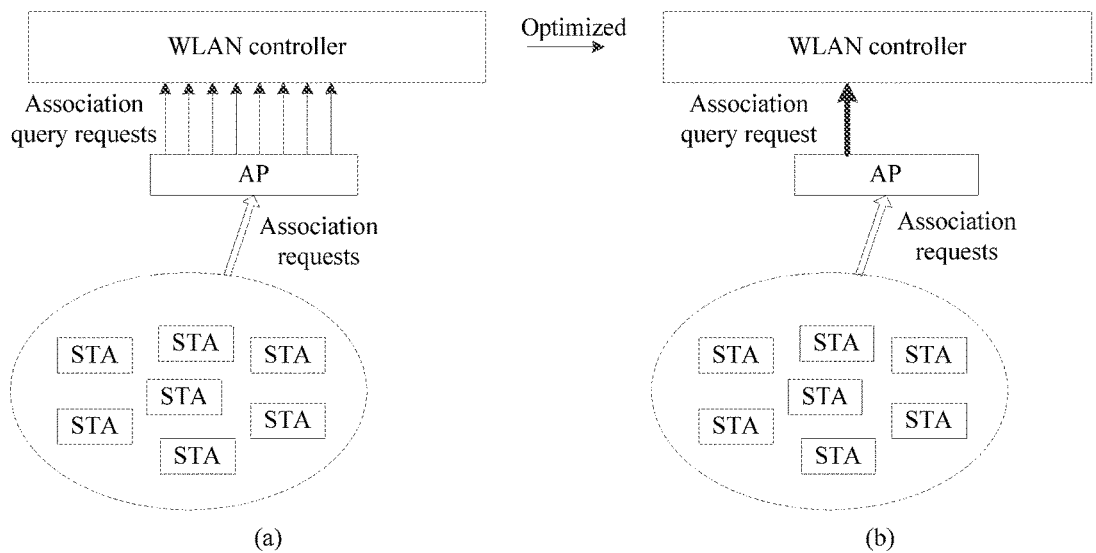
FIG. 2B
```
+-+-+-+-+-+-+-+-+-+-+-+-+-+-+-+-+-+-+-+-+-+-+-+-+-+-+-+-+-+-+-+-+
|                       Message type (Message Type)              |
+-+-+-+-+-+-+-+-+-+-+-+-+-+-+-+-+-+-+-+-+-+-+-+-+-+-+-+-+-+-+-+-+
|   Sequence number   |  Message element length  |               |
|     (Seq Num)       |   (Msg Element Length)   |  Flags (Flags)|
+-+-+-+-+-+-+-+-+-+-+-+-+-+-+-+-+-+-+-+-+-+-+-+-+-+-+-+-+-+-+-+-+
| Message element (Msg Element) [0...N]...
+-+-+-+-+-+-+-+-+-+-+
```
FIG. 2C
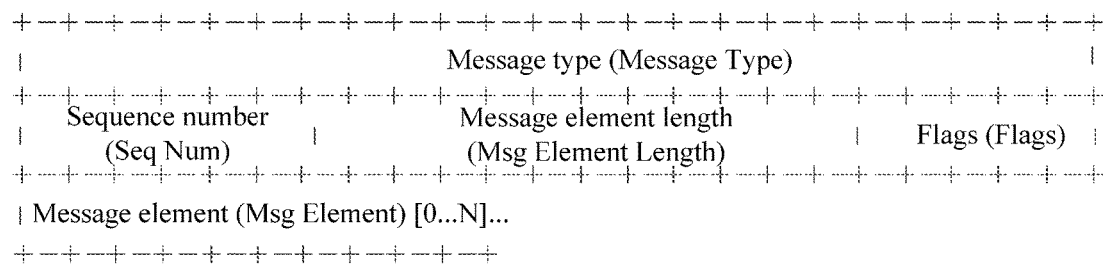
FIG. 2D

METHOD, APPARATUS, AND SYSTEM FOR ENHANCING CONCURRENT PROCESSING CAPABILITY OF WIRELESS LOCAL AREA NETWORK

CROSS-REFERENCE TO RELATED APPLICATIONS

This application is a continuation of International Application No. PCT/CN2016/083470, filed on May 26, 2016, which claims priority to Chinese Patent Application No. 201510293514.5, filed on Jun. 1, 2015, both of which are hereby incorporated by reference in their entireties.

TECHNICAL FIELD

This application relates to the field of network communications, and in particular, to a method, an apparatus, and a system for enhancing a concurrent processing capability of a WLAN.

BACKGROUND

In a large-scale wireless local area network (WLAN) scenario such as high-density venues and metros, within a short time period, a large quantity of mobile terminals request access to a WLAN or roam on a WLAN, and therefore large-scale concurrent events are caused. A large quantity of access points (AP) are usually configured on a WLAN on which there are a large quantity of stations (STA). To reduce difficulty in maintaining a large quantity of STAs, a WLAN controller may be configured to centrally perform configuration management on these APs. After receiving an association request sent by a STA, an AP sends the association request to the WLAN controller for processing. Therefore, the large-scale concurrent events severely affect a processing capability of the WLAN controller on the WLAN.

Due to a limitation on central processing unit (CPU) load of the WLAN controller, the WLAN controller can process limited requests per unit time, and a large quantity of mobile terminals need to wait a relatively long time before accessing the WLAN.

SUMMARY

To resolve a problem that a large quantity of mobile terminals wait a long time when a large quantity of access events need to be concurrently processed, this application provides a method, an apparatus, and a system for enhancing a concurrent processing capability of a WLAN. The technical solutions are as follows.

According to a first aspect, a method for enhancing a concurrent processing capability of a WLAN is provided, the WLAN includes an AP and a WLAN controller, and the method includes receiving, by the AP, a first association request sent by a first STA, where the first association request includes an identifier of the first STA, and the first association request is used to indicate that the first STA requests association with the AP; performing, by the AP, association with the first STA; sending, by the AP, a first association query request to the WLAN controller, where the first association query request includes the identifier of the first STA, and the first association query request is used to query whether the WLAN controller allows the first STA to be associated with the AP; receiving, by the AP after the AP performs association with the first STA, an association query response returned by the WLAN controller, where the association query response is a response message for the first association query request; and performing, by the AP, disassociation from the first STA if the association query response is used to instruct the AP not to perform association with the first STA.

With reference to the first aspect, in a first implementation manner of the first aspect, the method further includes, after the AP performs association with the first STA and before the AP receives the association query response, temporarily storing, by the AP, a data frame sent by the first STA; and if the association query response is used to instruct the AP to perform association with the first STA, forwarding, by the AP, the data frame from the first STA temporarily stored by the AP.

With reference to the first aspect or the first implementation manner of the first aspect, in a second implementation manner of the first aspect, after sending a second association query request and before sending the first association query request, the AP receives a second association request sent by a second STA, where the second association request includes an identifier of the second STA, the second STA is a STA different from the first STA, and the second association query request is an association query request prior to the first association query request sent by the AP; and the sending, by the AP, a first association query request to a WLAN controller includes, after determining that a first sending condition is met, sending, by the AP to the WLAN controller, the first association query request carrying the identifier of the first STA and the identifier of the second STA, where the first sending condition includes at least one of the following: a quantity of association requests received by the AP after the AP sends the second association query request reaches a first quantity threshold, or duration after the second association query request is sent reaches a first duration threshold.

With reference to any one of the first aspect, the first implementation manner of the first aspect, or the second implementation manner of the first aspect, in a third implementation manner of the first aspect, before the receiving, by the AP, an association query response returned by the WLAN controller, the method further includes forbidding, by the AP, sending the identifier of the first STA to the WLAN controller if the AP receives, after receiving the first association request, a third association request sent by the first STA, and the third association request includes the identifier of the first STA; and sending, by the AP, a third association query request to the WLAN controller if the AP does not receive, within a predetermined time period, the association query response returned by the WLAN controller, where the third association query request includes the identifier of the first STA.

With reference to any one of the first aspect, or the first implementation manner of the first aspect to the third implementation manner of the first aspect, in a fourth implementation manner of the first aspect, the method further includes performing, by the AP, disassociation from the first STA when a quantity of association query requests including the identifier of the first STA that are sent to the WLAN controller reaches a predetermined quantity threshold.

According to a second aspect, a method for enhancing a concurrent processing capability of a WLAN is provided, the WLAN includes an AP and a WLAN controller, and the method includes receiving, by the WLAN controller, a first association query request sent by the AP, where the first association query request includes an identifier of a first STA; determining, by the WLAN controller, whether to allow the first STA to be associated with the AP, to obtain a determining result about the first STA, where the determining result about the first STA indicates whether the first STA is allowed to be associated with the AP; and after determining that a second sending condition is met, sending, by the WLAN controller to the AP, a first association query response carrying the determining result about the first STA and a determining result about the second STA, where the second STA is a STA identified by a STA identifier in a second association query request, the second STA is different from the first STA, the second association query request is the same as or different from the first association query request, and the second sending condition includes at least one of the following: a quantity of determining results about the second STA that are obtained by the WLAN controller after the WLAN controller sends a second association query response last time reaches a second quantity threshold, or duration after a second association query response is sent last time reaches a second duration threshold.

According to a third aspect, an apparatus for enhancing a concurrent processing capability of a WLAN is provided, the WLAN includes an AP and a WLAN controller, and the apparatus includes a first receiving module configured to receive a first association request sent by a first STA, where the first association request includes an identifier of the first STA, and the first association request is used to indicate that the first STA requests association with the AP; an association module configured to perform association with the first STA; a sending module configured to send a first association query request to the WLAN controller, where the first association query request includes the identifier of the first STA, and the first association query request is used to query whether the WLAN controller allows the first STA to be associated with the AP; a second receiving module configured to, after the AP performs association with the first STA, receive an association query response returned by the WLAN controller, where the association query response is a response message for the first association query request; and a disassociation module configured to perform disassociation from the first STA when the association query response received by the second receiving module is used to instruct the AP not to perform association with the first STA.

With reference to the third aspect, in a first implementation manner of the third aspect, the apparatus further includes a buffering module configured to, after the association module performs association with the first STA and before the second receiving module receives the association query response, temporarily store a data frame sent by the first STA; and a forwarding module configured to, when the association query response received by the second receiving module is used to instruct the AP to perform association with the first STA, forward the data frame from the first STA temporarily stored by the buffering module.

With reference to the third aspect or the first implementation manner of the third aspect, in a second implementation manner of the third aspect, the first receiving module is further configured to, after a second association query request is sent and before the first association query request is sent, receive a second association request sent by a second STA, where the second association request includes an identifier of the second STA, the second STA is a STA different from the first STA, and the second association query request is an association query request prior to the first association query request sent by the AP; and the sending module is configured to, after it is determined that a first sending condition is met, send, to the WLAN controller, the first association query request carrying the identifier of the first STA and the identifier of the second STA, where the first sending condition includes at least one of the following: a quantity of association requests received by the AP after the AP sends the second association query request reaches a first quantity threshold, or duration after the second association query request is sent reaches a first duration threshold.

With reference to any one of the third aspect, the first implementation manner of the third aspect, or the second implementation manner of the third aspect, in a third implementation manner of the third aspect, the apparatus further includes a processing forbidding module configured to, before the second receiving module receives the association query response returned by the WLAN controller, and if the first receiving module receives, after receiving the first association request, a third association request sent by the first STA, and the third association request includes the identifier of the first STA, forbid sending the identifier of the first STA to the WLAN controller; and the sending module is further configured to send a third association query request to the WLAN controller when the second receiving module does not receive, within a predetermined time period, the association query response returned by the WLAN controller, where the third association query request includes the identifier of the first STA.

With reference to any one of the third aspect, or the first implementation manner of the third aspect to the third implementation manner of the third aspect, in a fourth implementation manner of the third aspect, the disassociation module is further configured to perform disassociation from the first STA when a quantity of association query requests including the identifier of the first STA that are sent to the WLAN controller reaches a predetermined quantity threshold.

According to a fourth aspect, an apparatus for enhancing a concurrent processing capability of a WLAN is provided, the WLAN includes an AP and a WLAN controller, and the apparatus includes a receiving module configured to receive a first association query request sent by the AP, where the first association query request includes an identifier of a first STA; a determining module configured to determine whether the first STA is allowed to be associated with the AP, to obtain a determining result about the first STA, where the determining result about the first STA indicates whether the first STA is allowed to be associated with the AP; and a sending module configured to, after it is determined that a second sending condition is met, send, to the AP, a first association query response carrying the determining result about the first STA and a determining result about a second STA, where the second STA is a STA identified by a STA identifier in a second association query request, the second STA is different from the first STA, the second association query request is the same as or different from the first association query request, and the second sending condition includes at least one of the following: a quantity of determining results about the second STA that are obtained by the WLAN controller after the WLAN controller sends a second association query response last time reaches a second quantity threshold, or duration after a second association query response is sent last time reaches a second duration threshold.

According to a fifth aspect, a system for enhancing a concurrent processing capability of a WLAN is provided, and the system includes a WLAN controller and an AP, where the WLAN controller includes the apparatus for enhancing a concurrent processing capability of a WLAN described in the fourth aspect and implementation manners of the fourth aspect; and the AP includes the apparatus for enhancing a concurrent processing capability of a WLAN described in the third aspect and implementation manners of the third aspect.

After receiving an association request sent by a first STA, an AP first performs association with the first STA, then asks a WLAN controller whether to allow the AP to perform association with the first STA, and performs disassociation from the first STA when a query response returned by the WLAN controller instructs to forbid the first STA from being associated with the AP. The AP may first perform association with the first STA, and when a network status is unsuitable for association with the first STA, the AP may perform disassociation from the first STA to reduce network load. Therefore, a related technology problem is resolved that a large quantity of mobile terminals cannot successfully access an AP due to a limitation on CPU load of a WLAN controller when a large quantity of access events need to be concurrently processed. When a large quantity of access events need to be concurrently processed, a STA can still be associated with at first, and user experience is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic diagram of an implementation environment related to a method for enhancing a concurrent processing capability of a WLAN according to some embodiments of the present disclosure;

FIG. 2A is a method flowchart of a method for enhancing a concurrent processing capability of a WLAN according to an embodiment of the present disclosure;

FIG. 2B is a schematic comparison diagram when a concurrent processing capability of a WLAN is enhanced according to an embodiment of the present disclosure;

FIG. 2C is a schematic structural diagram of a station status request frame or a station status response frame according to an embodiment of the present disclosure;

FIG. 2D is a schematic diagram of a station association format in a station status request frame or a station status response frame according to an embodiment of the present disclosure;

DESCRIPTION OF EMBODIMENTS

Figure 3:
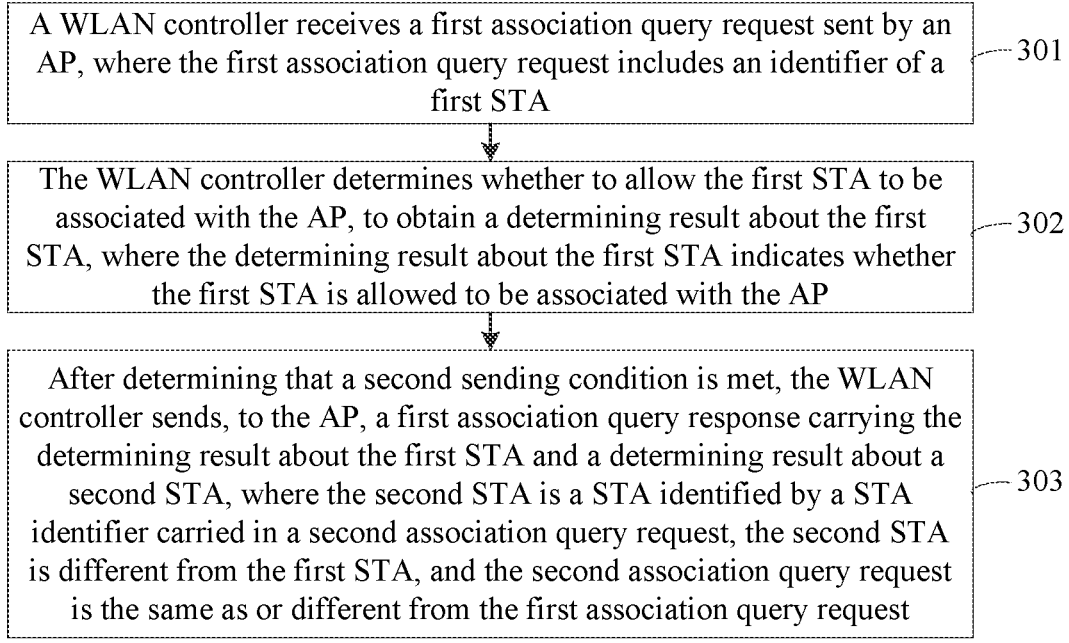
FIG. 3 is a method flowchart of a method for enhancing a concurrent processing capability of a WLAN according to another embodiment of the present disclosure.

To make the objectives, technical solutions, and advantages of the present disclosure clearer, the following further describes the implementation manners of the present disclosure in detail with reference to the accompanying drawings.

Referring to FIG. 1, FIG. 1 is a schematic diagram of an implementation environment related to a method for enhancing a concurrent processing capability of a WLAN according to some embodiments of the present disclosure. The implementation environment includes a WLAN controller 120, an AP 140, and STAs 160.

The WLAN controller 120 is connected to the AP 140 using a wired network.

The WLAN controller 120 determines a STA 160 that can be associated with the AP 140.

The AP 140 receives an association request from the STA 160, and responds to the association request.

The STA 160 may be a mobile device, for example, a smartphone, a tablet computer, a wearable device, and a multimedia playback device.

Referring to FIG. 2A, FIG. 2A is a method flowchart of a method for enhancing a concurrent processing capability of a WLAN according to an embodiment of the present disclosure. The method for enhancing a concurrent processing capability of a WLAN may include the following steps.

Step 201. An AP receives a first association request sent by a first STA, where the first association request includes an identifier of the first STA, and the first association request is used to indicate that the first STA requests association with the AP.

The first association request usually includes the identifier of the first STA. The identifier may be an identifier configured in advance or designated dynamically, or may be an address of the first STA, for example, a Media Access Control (MAC) address of the first STA.

An association request frame or a reassociation request frame may be used to implement the first association request herein. That is, the association request frame or the reassociation request frame is used to indicate that the first STA requests association with the AP.

Step 202. The AP performs association with the first STA.

After receiving the first association request, the AP responds to the first association request and performs association with the first STA. When the AP receives the first association request sent by the first STA, it indicates that the first STA wants to be associated with the AP. In this case, the AP may first perform association with the first STA before obtaining a decision on whether a WLAN controller allows the first STA to be associated with the AP or not.

Because association of the first STA with the AP is not allowed by the WLAN controller, although the first STA can send a data frame to the AP, the AP does not forward the data frame sent by the first STA. The AP may temporarily store the data frame sent by the first STA, and forward the temporarily stored data frame from the first STA only after the WLAN controller allows the first STA to be associated with the AP.

Generally, after the AP performs association with the first STA, the AP sends an association response to the first STA. The association response is used to indicate that the AP has performed association with the first STA. An association response (Association Response) frame or a reassociation response frame may be used to indicate that the AP has performed association with the first STA.

Step 203. The AP sends a first association query request to the WLAN controller, where the first association query request includes the identifier of the first STA, and the first association query request is used to query whether the WLAN controller allows the first STA to be associated with the AP.

The AP sends the first association query request after receiving the first association request. The AP may send the first association query request before, after, or when performing association with the first STA.

The AP sends the identifier of the first STA to the WLAN controller, and the WLAN controller determines whether to allow the first STA to be associated with the AP.

During practical implementation, a station configuration request frame may be used to implement the first association query request herein. That is, the station configuration request frame is used to query whether the WLAN controller allows the first STA to be associated with the AP.

When a large quantity of STAs request association with the AP at the same time or within a short time period, to reduce communication load between the AP and the WLAN controller as much as possible, association query requests that the AP needs to send to the WLAN controller may be combined. That is, identifiers of multiple STAs are combined in one association query request. Therefore, a quantity of messages exchanged between the AP and the WLAN controller can be greatly reduced. The AP sends, to the WLAN controller, the association query request carrying the identifiers of the multiple STAs that have sent multiple association requests. The identifiers of the multiple STAs include the identifier of the first STA.

After sending a second association query request and before sending the first association query request, the AP receives a second association request sent by a second STA. The second association request includes an identifier of the second STA. The second STA is a STA different from the first STA. The second association query request is an association query request prior to the first association query request sent by the AP.

The AP may determine, according to a first sending condition, STAs whose identifiers can be combined in one association query request. For example, when determining that the first sending condition for sending a combined first association query request is met, the AP sends the first association query request. The first sending condition may be that a quantity of association requests received by the AP after the AP sends the second association query request reaches a first quantity threshold. Alternatively, the first sending condition may be that duration after the second association query request is sent reaches a first duration threshold. Alternatively, the first sending condition may be either of the foregoing two, that is, a quantity of association requests received by the AP after the AP sends the second association query request reaches a first quantity threshold, or duration after the second association query request is sent reaches a first duration threshold. Alternatively, the first sending condition may be both of the foregoing two, that is, a quantity of association requests received by the AP after the AP sends the second association query request reaches a first quantity threshold, and duration after the second association query request is sent reaches a first duration threshold.

When determining that the first sending condition is met, the AP sends, to the WLAN controller, the first association query request carrying the identifier of the first STA and the identifier of the second STA.

After receiving an association request sent by one STA, the AP first adds an identifier of the STA to a queue, and does not immediately send, to the WLAN controller, an association query request carrying the identifier of the STA. The AP sends an association query request carrying identifiers of multiple STAs in the queue to the WLAN controller only when the first sending condition is met.

The first quantity threshold and the first duration threshold may be fixed or may be dynamically adjusted according to an actual network status.

Generally, identifiers of STAs included in the first association query request are different. If the AP receives association requests sent by a same STA for multiple times, only one of multiple identifiers in the generated first association query request belongs to the STA. To ensure that only one of multiple identifiers in the first association query request belongs to the STA, whether the identifier of the STA is in the queue is first detected when the identifier of the STA is to be added to the queue. If the identifier of the STA is in the queue, the identifier of the STA is not added to the queue. If the identifier of the STA is not in the queue, the identifier of the STA is added to the queue.

For example, referring to a comparison diagram in FIG. 2B, (a) of FIG. 2B shows implementation of sending, by the AP, association query requests to the WLAN controller when each association query request carries an identifier of one STA. When a large quantity of STAs need to be associated with the AP, the AP sends association query requests to the WLAN controller according to association requests requesting association with the AP. In this case, a quantity of association query requests between the AP and the WLAN controller is the same as a quantity of association requests sent by the STAs to the AP. Therefore, an extremely large quantity of messages are exchanged between the AP and the WLAN controller, and much bandwidth of a link between the AP and the WLAN controller is occupied.

In FIG. 2B, (b) shows implementation of sending, by the AP, an association query request to the WLAN controller when identifiers of STAs are combined in the association query request. The identifiers of the STAs are combined in the association query request sent by the AP to the WLAN controller, so that a quantity of association query requests between the AP and the WLAN controller is far less than a quantity of association requests sent by the STAs to the AP. Therefore, a small quantity of messages are exchanged between the AP and the WLAN controller, and less bandwidth of a link between the AP and the WLAN controller is occupied.

The AP and the WLAN controller may communicate with each other using the Control and Provisioning of Wireless Access Points (CAPWAP) protocol. The AP as a wireless termination point (WTP) in the CAPWAP protocol, and the WLAN controller as an access controller (AC) in the CAPWAP protocol separately run the CAPWAP protocol. In the CAPWAP protocol, the first association query request including identifiers of multiple STAs may be implemented using a station status request frame. For a structure of the station status request herein, refer to FIG. 2C. In the CAPWAP protocol, a station status request frame is added, and a message type (Message Type) of the station status request frame is defined as 101. A message element (Msg Element) in the station status request frame is a station association whose type value is 4096. A format of each station association is shown in FIG. 2D. A field corresponding to a radio identifier/result-code is a composite field. When the station association is carried in the station status request frame, the field is the radio identifier, a number value of the radio identifier usually ranges from 0 to 254, and an identifier of one STA may be added to a MAC address field. When the station status request frame needs to carry identifiers of multiple STAs, the station status request frame includes multiple station associations, and a MAC address field in each station association includes an identifier of one STA that the first association query request needs to include.

Step 204. After performing association with the first STA, the AP receives an association query response returned by the WLAN controller, where the association query response is a response message for the first association query request.

After performing determining according to the first association query request, the WLAN controller replies with the association query response. The association query response carries a response parameter indicating whether the first STA is allowed to be associated with the AP.

For example, when the WLAN controller allows the first STA to be associated with the AP, a value of a response parameter corresponding to the first STA in the association query response may be 0 or 1. When the WLAN controller does not allow the first STA to be associated with the AP, a value of a response parameter corresponding to the first STA in the association query response may be 1 or 0.

Step 205. The AP performs disassociation from the first STA when the association query response is used to instruct the AP not to perform association with the first STA.

When the association query response is used to instruct the AP to perform association with the first STA, the AP performs normal service processing. In this case, the AP normally processes the data frame from the first STA that has been temporarily stored, and sends, to the first STA, data requested by the first STA.

The AP performs disassociation from the first STA when the association query response is used to instruct the AP not to perform association with the first STA. The disassociated first STA cannot continue sending data to the AP. Optionally, after performing disassociation from the first STA, the AP may send a disassociation frame to the first STA to cancel association between the first STA and the AP.

In conclusion, according to the method for enhancing a concurrent processing capability of a WLAN in this embodiment of the present disclosure, after receiving a first association request sent by a first STA, an AP first performs association with the first STA, then asks a WLAN controller whether to allow the AP to perform association with the first STA, and performs disassociation from the first STA when a query response message returned by the WLAN controller instructs to forbid the first STA from being associated with the AP. The AP may first perform association with the first STA, and when a network status is unsuitable for association with the first STA, the AP may perform disassociation from the first STA to reduce network load. Therefore, a related technology problem is resolved that a large quantity of mobile terminals cannot be successfully associated with an AP due to a limitation on CPU load of a WLAN controller when a large quantity of association events need to be concurrently processed. When a large quantity of association events need to be concurrently processed, a STA can still be associated with at first, and user experience is improved.

After performing association with the first STA and before receiving an association query response returned by the WLAN controller, if the AP receives, after receiving the first association request, a third association request sent by the first STA, and the third association request includes the identifier of the first STA, to avoid repeated processing, the AP may forbid sending the identifier of the first STA to the WLAN controller. In addition, if the AP does not receive, within a predetermined time period, the association query response returned by the WLAN controller, to ensure as much as possible that the WLAN controller can process an association request sent from the first STA, the AP sends a third association query request to the WLAN controller. The third association query request includes the identifier of the first STA.

In addition, when the AP sends, for multiple times, an association query request to the WLAN controller with respect to the association request of the first STA, to avoid continuing adding processing load of the WLAN controller, the AP may perform disassociation from the first STA. That is, when a quantity of association query requests including the identifier of the first STA that are sent by the AP to the WLAN controller reaches a predetermined quantity threshold, the AP performs disassociation from the first STA, and instructs the first STA not to send an association request to the AP within a specified time period.

In addition, after the AP performs disassociation from the first STA, it usually indicates that the first STA cannot obtain association permission from the WLAN controller currently. To avoid that the STA repeatedly sends an association request within a short time period and cause burden on a network, the first STA may be suppressed temporarily. That is, if an association request sent by the first STA is received again within a predetermined time period after the first STA is instructed to perform disassociation from the AP, the association request is forbidden from being processed.

Referring to FIG. 3, FIG. 3 is a method flowchart of a method for enhancing a concurrent processing capability of a WLAN according to another embodiment of the present disclosure. The method for enhancing a concurrent processing capability of a WLAN may include the following steps.

Step 301. A WLAN controller receives a first association query request sent by an AP, where the first association query request includes an identifier of a first STA.

The first association query request is used to request the WLAN controller to determine whether the first STA with the identifier of the first STA is allowed to be associated with the AP.

Step 302. The WLAN controller determines whether to allow the first STA to be associated with the AP, to obtain a determining result about the first STA, where the determining result about the first STA indicates whether the first STA is allowed to be associated with the AP.

The WLAN controller may determine, according to a current policy and a network status, whether to allow the first STA to be associated with the AP. The obtained determining result is used to indicate that the WLAN controller allows the first STA to be associated with the AP, or that the WLAN controller forbids the first STA from being associated with the AP.

Generally, the determining result may include the first STA and a response parameter. The response parameter may be used to indicate whether the WLAN controller allows the first STA corresponding to the response parameter to be associated with the AP.

For example, when the WLAN controller allows the first STA to be associated with the AP, the response parameter corresponding to the first STA in the determining result may be 0 or 1. When the WLAN controller forbids the first STA from being associated with the AP, the response parameter corresponding to the first STA in the determining result may be 1 or 0.

Step 303. After determining that a second sending condition is met, the WLAN controller sends, to the AP, a first association query response carrying the determining result about the first STA and a determining result about a second STA, where the second STA is a STA identified by a STA identifier carried in a second association query request, the second STA is different from the first STA, and the second association query request is the same as or different from the first association query request.

To reduce a quantity of messages exchanged between the AP and the WLAN controller, and occupy less bandwidth between the AP and the WLAN controller, after receiving the association query request sent by the AP, the WLAN controller may make no feedback directly but determine first whether the WLAN controller meets the second sending condition for sending an association query response.

The WLAN controller may determine, according to the second sending condition, STAs about which determining results are combined in one association query response. For example, when determining that the second sending condition for sending a combined first association query response is met, the WLAN controller sends the first association query response. The second sending condition may be that a quantity of determining results about the second STA that are obtained by the WLAN controller after the WLAN controller sends a second association query response last time reaches a second quantity threshold. Alternatively, the second sending condition may be that duration after a second association query response is sent last time reaches a second duration threshold. Alternatively, the second sending condition may be either of the foregoing two, that is, a quantity of determining results about the second STA that are obtained by the WLAN controller after the WLAN controller sends a second association query response last time reaches a second quantity threshold, or duration after a second association query response is sent last time reaches a second duration threshold. Alternatively, the second sending condition may be both of the foregoing two, that is, a quantity of determining results about the second STA that are obtained by the WLAN controller after the WLAN controller sends a second association query response last time reaches a second quantity threshold, and duration after a second association query response is sent last time reaches a second duration threshold.

The second quantity threshold and the second duration threshold may be fixed or may be dynamically adjusted according to an actual network status.

It should be additionally noted that the second quantity threshold herein may be the same as or different from the foregoing first quantity threshold, and the second duration threshold herein may be the same as or different from the foregoing first duration threshold.

In the CAPWAP protocol, an association query response carrying determining results about multiple STAs may be implemented using a station status response frame. For a structure of the station status response frame herein, still refer to FIG. 2C. In the CAPWAP protocol, a station status response frame is added, and a message type of the station status response frame is defined as 102. A message element in the station status response frame is a station association whose type value is 4096. For a format of each station association, still refer to FIG. 2D. A field corresponding to a radio identifier/result-code is a composite field. When the station association is carried in the station status response frame, the field is the result-code, and an identifier of one STA may be carried in a MAC address field. The result-code is used to store a determining result from the WLAN controller for a STA in the station association. When a value of the result-code ranges from 0 to 254, it indicates that the WLAN controller allows the STA in the station association to be associated with the AP. When a value of the result-code is—1 or 255, it indicates that the WLAN controller forbids the STA in the station association from being associated with the AP. When the station status response frame needs to carry determining results about multiple STAs, the station status response frame includes multiple station associations, a MAC address field in each station association includes an identifier of one STA that the association query response needs to include, and the field corresponding to the radio identifier/result-code corresponds to a determining result about the STA.

In conclusion, according to the method for enhancing a concurrent processing capability of a WLAN in this embodiment of the present disclosure, when an association query response is to be sent to an AP, determining results about multiple STAs may be added to one association query response. A WLAN controller may combine the determining results about the multiple STAs in one association query response, so as to reduce a quantity of association query responses. Therefore, a related technology problem of bandwidth congestion between the AP and the WLAN controller when a large quantity of association events need to be concurrently processed is resolved. Less bandwidth between the AP and the WLAN controller can be occupied when a large quantity of association events need to be concurrently processed.

This optimization feature of "first performing association with a STA and then sending to a WLAN controller for processing" in the foregoing embodiments is more beneficial to processing when a large quantity of STAs are concurrently associated with. However, when a small quantity of STAs request association with an AP and a WLAN processing capability is fully competent, to improve STA association efficiency as much as possible, the optimization feature of "first performing association with a STA and then sending to a WLAN controller for processing" may be deactivated. This ensures that the AP immediately sends an association query request to the WLAN controller with respect to an association request sent by the STA.

In the optimization feature, after receiving an association request sent by a STA, an AP performs the step of performing association with the STA, and then performs the step of sending, to a WLAN controller, an association query request carrying an identifier of the STA.

During specific implementation, the AP may activate the optimization feature in the following three manners.

In a first manner, when an activation condition is met, the WLAN controller sends enabling signaling to the AP, so that the AP determines to activate this optimization feature after receiving the enabling signaling.

The activation condition herein may be that a specified use peak hour (for example, 19:00 every day) is reached, or that enabling signaling configured by an administrator is received, or that processor load of the WLAN controller reaches a predetermined load threshold (for example, 80%).

In a second manner, the WLAN controller sends, to the AP, a notification carrying a predetermined load threshold used to instruct the AP to activate the optimization feature, and delivers an indication of processor load of the WLAN controller to the AP in real time after sending the notification, so that the AP activates the optimization feature when determining that the load delivered by the WLAN controller reaches the predetermined load threshold.

In a third manner, when the WLAN controller agrees with the AP in advance that a basis for activating the optimization feature is a round-trip time (RTT) between the AP and the WLAN controller, the AP may obtain the RTT between the AP and the WLAN controller in real time, and determine, according to the RTT, whether to activate the optimization feature of the AP.

Obviously, in practical application, there may still be another manner for controlling the AP to activate the optimization feature, and details are not described herein.

Figure 4:
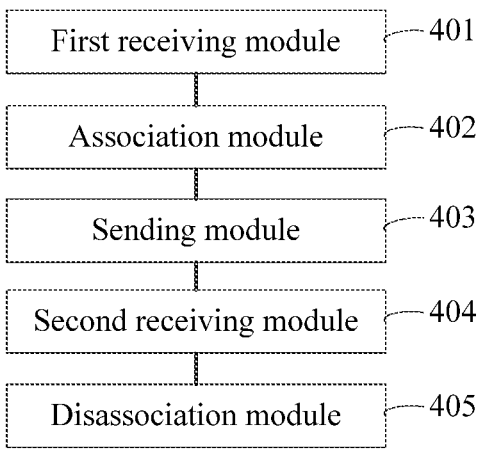
FIG. 4 is a structural block diagram of an apparatus for enhancing a concurrent processing capability of a WLAN according to an embodiment of the present disclosure.

Referring to FIG. 4, FIG. 4 is a structure block diagram of an apparatus for enhancing a concurrent processing capability of a WLAN according to an embodiment of the present disclosure. The apparatus for enhancing a concurrent processing capability of a WLAN may include a first receiving module 401, an association module 402, a sending module 403, a second receiving module 404, and a disassociation module 405.

The first receiving module 401 may be configured to receive a first association request sent by a first STA. The first association request includes an identifier of the first STA, and the first association request is used to indicate that the first STA requests association with an AP.

The association module 402 performs association with the first STA.

The sending module 403 may be configured to send a first association query request to a WLAN controller. The first association query request includes the identifier of the first STA, and the first association query request is used to query whether the WLAN controller allows the first STA to be associated with the AP.

The second receiving module 404 may be further configured to, after the AP performs association with the first STA, receive an association query response returned by the WLAN controller. The association query response is a response message for the first association query request.

The disassociation module 405 may be configured to perform disassociation from the first STA when the association query response received by the second receiving module 404 is used to instruct the AP not to perform association with the first STA.

Figure 5:
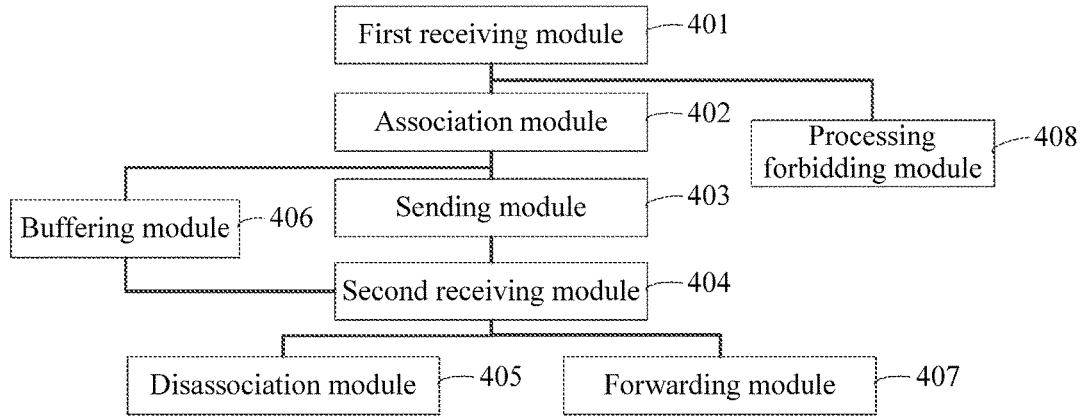
FIG. 5 is a structural block diagram of an apparatus for enhancing a concurrent processing capability of a WLAN according to another embodiment of the present disclosure.

In a possible implementation manner, referring to FIG. 5, FIG. 5 is a structure block diagram of an apparatus for enhancing a concurrent processing capability of a WLAN according to another embodiment of the present disclosure. In FIG. 5, the apparatus for enhancing a concurrent processing capability of a WLAN may further include a buffering module 406 and a forwarding module 407.

The buffering module 406 is configured to, after the association module 402 performs association with the first STA and before the second receiving module 404 receives the association query response, temporarily store a data frame sent by the first STA.

The forwarding module 407 is configured to, when the association query response received by the second receiving module 404 is used to instruct the AP to perform association with the first STA, forward the data frame from the first STA temporarily stored by the buffering module 406.

In a possible implementation manner, the first receiving module 401 is further configured to, after the sending module 403 sends a second association query request and before the sending module 403 sends the first association query request, receive a second association request sent by a second STA. The second association request includes an identifier of the second STA. The second STA is a STA different from the first STA. The second association query request is an association query request prior to the first association query request sent by the AP.

The sending module 403 may be configured to, after it is determined that a first sending condition is met, send, to the WLAN controller, the first association query request carrying the identifier of the first STA and the identifier of the second STA, where the first sending condition includes one or two of the following: a quantity of second association requests received by the AP after the AP sends the second association query request last time reaches a first quantity threshold, or duration after the second association query request is sent last time reaches a first duration threshold.

In a possible implementation manner, referring to FIG. 5, the apparatus for enhancing a concurrent processing capability of a WLAN may further include a processing forbidding module 408.

The processing forbidding module 408 may be configured to, before the second receiving module 404 receives the association query response returned by the WLAN controller, and if the first receiving module 401 receives, after receiving the first association request, a third association request sent by the first STA, and the third association request includes the identifier of the first STA, forbid sending the identifier of the first STA to the WLAN controller.

The sending module 403 is further configured to send a third association query request to the WLAN controller when the second receiving module 404 does not receive, within a predetermined time period, the association query response returned by the WLAN controller. The third association query request includes the identifier of the first STA.

In a possible implementation manner, the disassociation module 405 is further configured to perform disassociation from the first STA when a quantity of association query requests including the identifier of the first STA that are sent to the WLAN controller reaches a predetermined quantity threshold.

In conclusion, according to the apparatus for enhancing a concurrent processing capability of a WLAN in this embodiment of the present disclosure, after receiving a first association request sent by a first STA, an AP first performs association with the first STA, then asks a WLAN controller whether to allow the AP to perform association with the first STA, and performs disassociation from the first STA when a response message returned by the WLAN controller instructs to forbid the first STA from being associated with the AP. The AP may first perform association with the first STA, and when a network status is unsuitable for association with the first STA, the AP may perform disassociation from the first STA to reduce network load. Therefore, a related technology problem is resolved that a large quantity of mobile terminals cannot be successfully associated with an AP due to a limitation on CPU load of a WLAN controller when a large quantity of association events need to be concurrently processed. When a large quantity of association events need to be concurrently processed, a STA can still be associated with at first, and user experience is improved.

Figure 6:
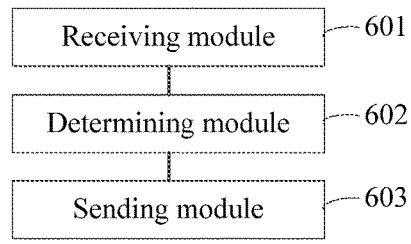
FIG. 6 is a structural block diagram of an apparatus for enhancing a concurrent processing capability of a WLAN according to still another embodiment of the present disclosure.

Referring to FIG. 6, FIG. 6 is a structure block diagram of an apparatus for enhancing a concurrent processing capability of a WLAN according to still another embodiment of the present disclosure. The apparatus for enhancing a concurrent processing capability of a WLAN may include a receiving module 601, a determining module 602, and a sending module 603.

The receiving module 601 is configured to receive a first association query request sent by an AP. The first association query request includes an identifier of a first STA.

The determining module 602 is configured to determine whether to allow the first STA to be associated with the AP, to obtain a determining result about the first STA. The determining result about the first STA indicates whether the first STA is allowed to be associated with the AP.

The sending module 603 is configured to, after it is determined that a second sending condition is met, send, to the AP, a first association query response carrying the determining result about the first STA and a determining result about a second STA. The second STA is a STA identified by a STA identifier carried in a second association query request, the second STA is different from the first STA, the second association query request is the same as or different from the first association query request, and the second sending condition includes one or two of the following: a quantity of determining results about the second STA that are obtained by the WLAN controller after the WLAN controller sends a second association query response last time reaches a second quantity threshold, or duration after a second association query response is sent last time reaches a second duration threshold.

In conclusion, according to the apparatus for enhancing a concurrent processing capability of a WLAN in this embodiment of the present disclosure, when an association query response is to be sent to an AP, determining results about multiple STAs may be added to one association query response. A WLAN controller may combine the determining results about the multiple STAs in one association query response, so as to reduce a quantity of association query responses. Therefore, a related technology problem of bandwidth congestion between the AP and the WLAN controller when a large quantity of association events need to be concurrently processed is resolved. Less bandwidth between the AP and the WLAN controller can be occupied when a large quantity of association events need to be concurrently processed.

It should be noted that when the apparatus for enhancing a concurrent processing capability of a WLAN in the foregoing embodiments concurrently processes association requests, division of the foregoing function modules is only used as an example for description. In practical application, the foregoing functions may be allocated, according to a requirement, to different function modules to be completed. That is, internal structures of the AP and the WLAN controller are divided into different function modules, so as to complete some or all functions described above. In addition, the apparatus for enhancing a concurrent processing capability of a WLAN in the foregoing embodiments and the embodiments of the method for enhancing a concurrent processing capability of a WLAN belong to a same conception. For a specific implementation process of the apparatus for enhancing a concurrent processing capability of a WLAN, refer to the method embodiments. Details are not described herein again.

Figure 7:
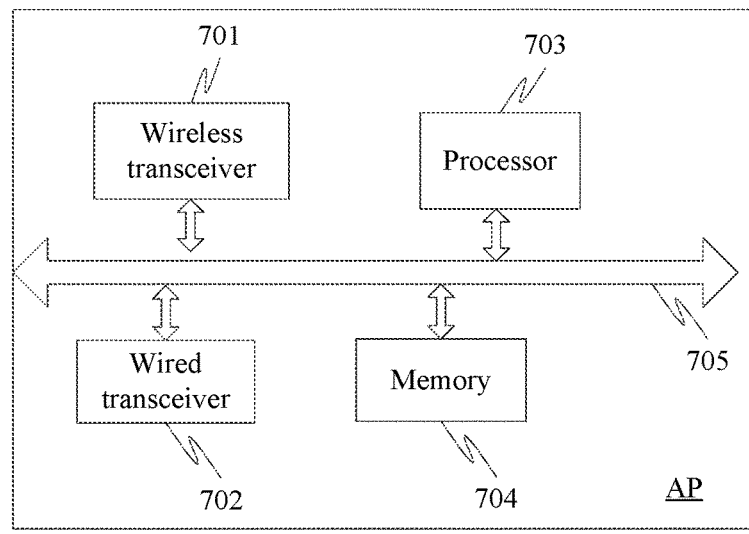
FIG. 7 is a structural block diagram of an AP according to an embodiment of the present disclosure.

Referring to FIG. 7, FIG. 7 is a schematic structural diagram of an AP according to an embodiment of the present disclosure. The AP may include a wireless transceiver 701, a wired transceiver 702, a processor 703, and a memory 704. The wired transceiver 702, the wireless transceiver 701, and the memory 704 are connected to the processor 703 using a bus 705. The memory 704 stores at least one computer application program. The processor 703 may perform a corresponding operation according to the computer application program stored in the memory 704.

The processor 703 is configured to control the wireless transceiver 701 to receive a first association request sent by a first STA. The first association request includes an identifier of the first STA, and the first association request is used to indicate that the first STA requests association with the AP.

The processor 703 is further configured to control the wireless transceiver 701 to perform association with the first STA.

The processor 703 is further configured to control the wired transceiver 702 to send a first association query request to a WLAN controller. The first association query request includes the identifier of the first STA, and the first association query request is used to query whether the WLAN controller allows the first STA to be associated with the AP.

After the wireless transceiver 701 performs association with the first STA, the processor 703 controls the wired transceiver 702 to receive an association query response returned by the WLAN controller. The association query response is a response message for the first association query request.

The processor 703 controls the wireless transceiver 701 to perform disassociation from the first STA when the association query response received by the wired transceiver 702 is used to instruct the AP not to perform association with the first STA.

In a possible implementation manner, the processor 703 is further configured to temporarily store a data frame sent by the first STA, after the wireless transceiver 701 performs association with the first STA and before the wired transceiver 702 receives the association query response.

The processor 703 is further configured to forward the data frame from the first STA temporarily stored by the AP, when the association query response received by the wired transceiver 702 is used to instruct the AP to perform association with the first STA.

In a possible implementation manner, the processor 703 further controls the wireless transceiver 701 to receive a second association request sent by a second STA, after the wired transceiver 702 sends a second association query request and before the wired transceiver 702 sends the first association query request. The second association request includes an identifier of the second STA. The second STA is a STA different from the first STA, and the second association query request is an association query request prior to the first association query request sent by the AP.

The processor 703 is further configured to, after determining that a first sending condition is met, control the wired transceiver 702 to send the first association query request carrying the identifier of the first STA and the identifier of the second STA to the WLAN controller. The first sending condition includes at least one of the following: a quantity of association requests received by the AP after the AP sends the second association query request reaches a first quantity threshold, or duration after the second association query request is sent reaches a first duration threshold.

In a possible implementation manner, the processor 703 is further configured to, before the wired transceiver 702 receives the association query response returned by the WLAN controller and if the wireless transceiver 701 receives, after receiving the first association request, a third association request sent by the first STA, forbid the wired transceiver 702 sending the identifier of the first STA to the WLAN controller.

The processor 703 is further configured to control the wired transceiver 702 to send a third association query request to the WLAN controller when the wired transceiver 702 does not receive, within a predetermined time period, the association query response returned by the WLAN controller. The third association query request includes the identifier of the first STA.

In a possible implementation manner, the processor 703 is further configured to control the wireless transceiver 701 to perform disassociation from the first STA when a quantity of association query requests including the identifier of the first STA that are sent to the WLAN controller reaches a predetermined quantity threshold.

In conclusion, according to the AP provided in this embodiment of the present disclosure, after receiving a first association request sent by a first STA, the AP performs association with the first STA, asks a WLAN controller whether to allow the AP to perform association with the first STA, and performs disassociation from the first STA when an association query response returned by the WLAN controller instructs to forbid the AP from performing association with the first STA. The AP may first perform association with the first STA, and when a network status is unsuitable for association with the first STA, the AP may perform disassociation from the first STA to reduce network load. Therefore, a related technology problem is resolved that a large quantity of mobile terminals cannot be successfully associated with an AP due to a limitation on CPU load of a WLAN controller when a large quantity of association events need to be concurrently processed. When a large quantity of association events need to be concurrently processed, a STA can still be associated with at first, and user experience is improved.

Figure 8:
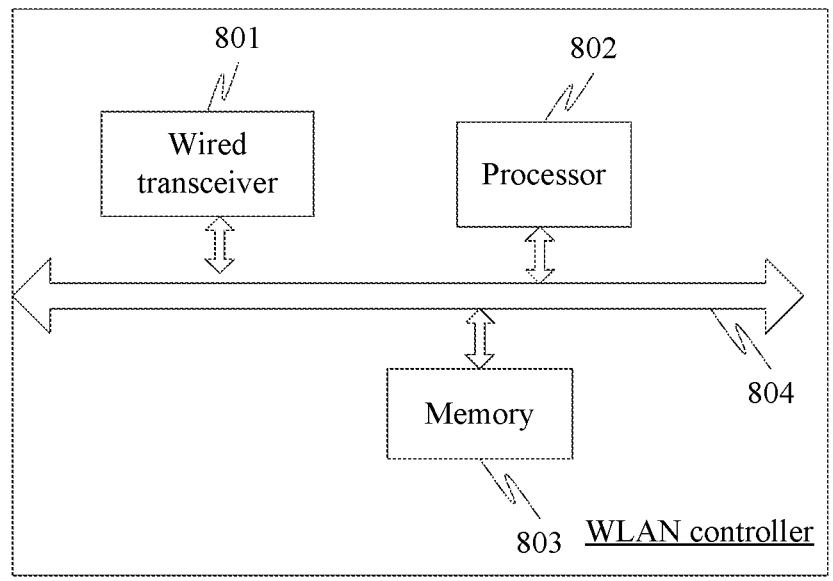
FIG. 8 is a structural block diagram of a WLAN controller according to an embodiment of the present disclosure.

Referring to FIG. 8, FIG. 8 is a schematic structural diagram of a WLAN controller according to an embodiment of the present disclosure. The WLAN controller may include a wired transceiver 801, a processor 802, and a memory 803. The wired transceiver 801 and the memory 803 are connected to the processor 802 using a bus 804. The memory 803 stores at least one computer application program. The processor 802 may perform a corresponding operation according to the computer application program stored in the memory 803.

The processor 802 is configured to control the wired transceiver 801 to receive a first association query request sent by an AP. The first association query request includes an identifier of a first STA.

The processor 802 is configured to determine whether to allow the first STA to be associated with the AP, to obtain a determining result about the first STA. The determining result about the first STA indicates whether the first STA is allowed to be associated with the AP.

The processor 802 is further configured to, after determining that a second sending condition is met, control the wired transceiver 801 to send, to the AP, a first association query response carrying the determining result about the first STA and a determining result about a second STA. The second STA is a STA identified by a STA identifier carried in a second association query request. The second STA is the same as or different from the first STA. The second association query request is the same as or different from the first association query request. The second sending condition includes at least one of the following: a quantity of determining results about the second STA that are obtained by the WLAN controller after the WLAN controller sends a second association query response last time reaches a second quantity threshold, or duration after a second association query response is sent last time reaches a second duration threshold.

In conclusion, according to the WLAN controller provided in this embodiment of the present disclosure, when an association query response is to be sent to an AP, determining results about multiple STAs may be added to one association query response. The WLAN controller may combine the determining results about the multiple STAs in one association query response, so as to reduce a quantity of association query responses. Therefore, a related technology problem of bandwidth congestion between the AP and the WLAN controller when a large quantity of association events need to be concurrently processed is resolved. Less bandwidth between the AP and the WLAN controller can be occupied when a large quantity of association events need to be concurrently processed.

Figure 9:
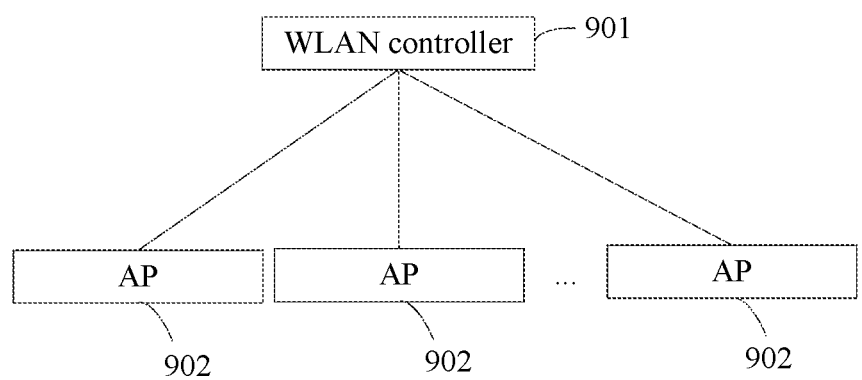
FIG. 9 is a schematic structural diagram of a system for enhancing a concurrent processing capability of a WLAN according to an embodiment of the present disclosure.

Referring to FIG. 9, FIG. 9 is a schematic structural diagram of a system for enhancing a concurrent processing capability of a WLAN according to an embodiment of the present disclosure. The system for enhancing a concurrent processing capability of a WLAN may include a WLAN controller 901 and an AP 902.

The WLAN controller 901 may include the apparatus for enhancing a concurrent processing capability of a WLAN as shown in FIG. 6. Alternatively, the WLAN controller 901 may be the WLAN controller shown in FIG. 8.

The AP 902 may include the apparatus for enhancing a concurrent processing capability of a WLAN as shown in FIG. 4 or FIG. 5. Alternatively, the AP 902 may be the AP shown in FIG. 7.

In conclusion, according to the system for enhancing a concurrent processing capability of a WLAN in this embodiment of the present disclosure, after receiving a first association request sent by a first STA, an AP performs association with the first STA, asks a WLAN controller whether to allow the AP to perform association with the first STA, and performs disassociation from the first STA when an association query response returned by the WLAN controller instructs to forbid the AP from performing association with the first STA. The AP may first perform association with the first STA, and when a network is unsuitable for association with the first STA, the AP may perform disassociation from the first STA to reduce network load. Therefore, a related technology problem is resolved that a large quantity of mobile terminals cannot be successfully associated with an AP due to a limitation on CPU load of a WLAN controller when a large quantity of association events need to be concurrently processed. When a large quantity of association events need to be concurrently processed, a STA can still be associated with at first, and user experience is improved.

In addition, association query requests and association query responses between the AP and the WLAN controller may be combined, and therefore, much less bandwidth between the AP and the WLAN controller can be occupied, and a system concurrent processing capability is enhanced. Finally, this achieves a comprehensive effect of an increased user association speed, an enhanced system concurrent processing capability, and preventing a system deterioration risk after overload.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and module, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module division is merely logical function division and may be other division in practical implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The modules described as separate parts may or may not be physically separate, and parts displayed as modules may or may not be physical modules, may be located in one position, or may be distributed on a plurality of network modules. Some or all of the units may be selected according to actual needs to achieve the objectives of the solutions of the embodiments.

In addition, function modules in the embodiments of the present disclosure may be integrated into one processing module, or each of the modules may exist alone physically, or two or more modules are integrated into one module.

When the functions are implemented in the form of a software function module and sold or used as an independent product, the functions may be stored in a computer-readable storage medium. The technical solutions of the present disclosure or the part of the technical solutions may be implemented in a form of a software product. The software product is stored in a storage medium, and includes instructions for instructing a computer device (which may be a personal computer, a server, a network device, or the like) to perform all or some of the steps of the methods described in the embodiments of the present disclosure. The storage medium may be a randomaccess memory (RAM), read-only memory (ROM), a flash memory, a hard disk drive (HDD), a solid state drive (SSD), a magnetic tape, a floppy disk, an optical disc, or any combination thereof.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for enhancing a concurrent processing capability of a wireless local area network (WLAN), comprising:
   receiving, by a wireless transceiver of an access point (AP), a first association request from a first station (STA), wherein the first association request comprises an identifier of the first STA, and wherein the first association request is used to indicate that the first STA requests association with the AP;
   performing, by the wireless transceiver of the AP, association with the first STA;
   sending, by a wired transceiver of the AP, a first association query request to a WLAN controller, wherein the first association query request comprises the identifier of the first STA, and wherein the first association query request is used to query whether the WLAN controller allows the first STA to be associated with the AP;
   receiving, by the wired transceiver of the AP after the AP performs association with the first STA, an association query response from the WLAN controller, wherein the association query response is a response message for the first association query request;
   performing, by the wireless transceiver of the AP, disassociation from the first STA when the association query response is used to instruct the AP not to perform association with the first STA;
   temporarily storing, by the AP, a data frame from the first STA after the AP performs association with the first STA and before the AP receives the association query response; and
   forwarding, by the AP, the data frame from the first STA temporarily stored by the AP when the association query response is used to instruct the AP to perform association with the first STA.

2. The method according to claim 1, wherein the AP receives a second association request from a second STA after sending a second association query request and before sending the first association query request, wherein the second association request comprises an identifier of the second STA, wherein the second STA is a STA different from the first STA, wherein the second association query request is an association query request prior to the first association query request from the AP, wherein sending, by the AP, the first association query request to the WLAN controller comprises sending, by the AP to the WLAN controller, the first association query request carrying the identifier of the first STA and the identifier of the second STA after determining that a first sending condition is met, wherein the first sending condition comprises at least one of:
   a quantity of association requests received by the AP after the AP sends the second association query request reaches a first quantity threshold; or
   a duration after the second association query request is sent reaches a first duration threshold.

3. The method according to claim 1, wherein before receiving, by the AP, the association query response from the WLAN controller, the method further comprises:
   forbidding, by the AP, sending the identifier of the first STA to the WLAN controller when the AP receives a third association request from the first STA after receiving the first association request, wherein the third association request comprises the identifier of the first STA; and
   sending, by the AP, a third association query request to the WLAN controller when the AP does not receive the association query response from the WLAN controller within a predetermined time period, wherein the third association query request comprises the identifier of the first STA.

4. The method according to claim 1, wherein the method further comprises performing, by the AP, disassociation from the first STA when a quantity of association query requests comprising the identifier of the first STA that are sent to the WLAN controller reaches a predetermined quantity threshold.

5. A method for enhancing a concurrent processing capability of a wireless local area network (WLAN), comprising:

receiving, by a WLAN controller, a first association query request from an access point (AP), wherein the first association query request comprises an identifier of a first station (STA);

determining, by the WLAN controller, whether to allow the first STA to be associated with the AP in order to obtain a determining result about the first STA, wherein the determining result about the first STA indicates whether the first STA is allowed to be associated with the AP; and sending, by the WLAN controller to the AP, a first association query response carrying the determining result about the first STA and a determining result about a second STA after determining that a second sending condition is met, wherein the second STA is a STA identified by a STA identifier in a second association query request, wherein the second STA is different from the first STA, wherein the second association query request is the same as or different from the first association query request, and wherein the second sending condition comprises at least one of:

a quantity of determining results about the second STA that are obtained by the WLAN controller after the WLAN controller sends a second association query response last time reaches a second quantity threshold; or a duration after a second association query response is last sent reaches a second duration threshold.

6. An access point (AP) comprising:
a wireless transceiver;
a wired transceiver;
a memory storing executable instructions; and
a processor coupled to the memory, the wireless transceiver, and the wired transceiver, wherein the processor is configured to:
receive, using the wireless transceiver, a first association request from a first station (STA), wherein the first association request comprises an identifier of the first STA, and wherein the first association request is used to indicate that the first STA requests association with the AP;
perform association with the first STA using the wireless transceiver;
send a first association query request to a wireless local area network (WLAN) controller using the wired transceiver, wherein the first association query request comprises the identifier of the first STA, and wherein the first association query request is used to query whether the WLAN controller allows the first STA to be associated with the AP;
receive, using the wired transceiver, an association query response from the WLAN controller after the AP performs association with the first STA, wherein the association query response is a response message for the first association query request;
perform disassociation from the first STA using the wireless transceiver when the association query response is used to instruct the AP not to perform association with the first STA;
temporarily store, using the memory, a data frame from the first STA after the AP performs association with the first STA and before the AP receives the association query response; and
forward the temporarily stored data frame from the first STA when the association query response is used to instruct the AP to perform association with the first STA.

7. The AP according to claim 6, wherein the processor is further configured to:
receive a second association request from a second STA after sending a second association query request and before sending the first association query request, wherein the second association request comprises an identifier of the second STA, wherein the second STA is a STA different from the first STA, and wherein the second association query request is an association query request sent prior to the first association query request; and
send, using the wired transceiver to the WLAN controller, the first association query request carrying the identifier of the first STA and the identifier of the second STA after determining that a first sending condition is met, wherein the first sending condition comprises at least one of:
a quantity of association requests received after the second association query request is sent reaches a first quantity threshold; or
a duration after the second association query request is sent reaches a first duration threshold.

8. The AP according to claim 6, wherein the processor is further configured to:
forbid sending the identifier of the first STA to the WLAN controller before receiving the association query response from the WLAN controller and after receiving the first association request when receiving a third association request from the first STA, wherein the third association request comprises the identifier of the first STA; and
send a third association query request to the WLAN controller when the association query response from the WLAN controller is not received within a predetermined time period, wherein the third association query request comprises the identifier of the first STA.

9. The AP according to claim 6, wherein the processor is further configured to perform disassociation from the first STA using the wireless transceiver when a quantity of association query requests comprising the identifier of the first STA that are sent to the WLAN controller reaches a predetermined quantity threshold.

10. A wireless local area network (WLAN) controller, comprising:
a wired transceiver; and
a processor coupled to the wired transceiver, wherein the processor is configured to:
receive, using the wired transceiver, a first association query request from an access point (AP), wherein the first association query request comprises an identifier of a first station (STA);
determine whether the first STA is allowed to be associated with the AP in order to obtain a determining result about the first STA, wherein the determining result about the first STA indicates whether the first STA is allowed to be associated with the AP; and
send, to the AP using the wired transceiver, a first association query response carrying the determining result about the first STA and a determining result about a second STA after determining that a second sending condition is met, wherein the second STA is a STA identified by a STA identifier in a second association query request, wherein the second STA is different from the first STA, wherein the second association query request is the same as or different from the first association query request, and wherein the second sending condition comprises at least one of:

a quantity of determining results about the second STA that are obtained by the WLAN controller after the WLAN controller sends a second association query response last time reaches a second quantity threshold; or a duration after a second association query response is last sent reaches a second duration threshold.

* * * * *